(No Model.)
W. H. KALTENBECK.
CAR FENDER.
No. 565,621. Patented Aug. 11, 1896.
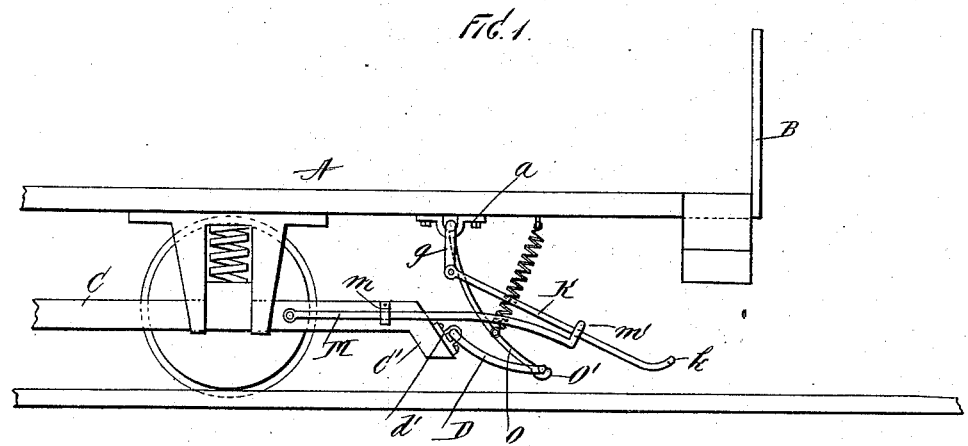
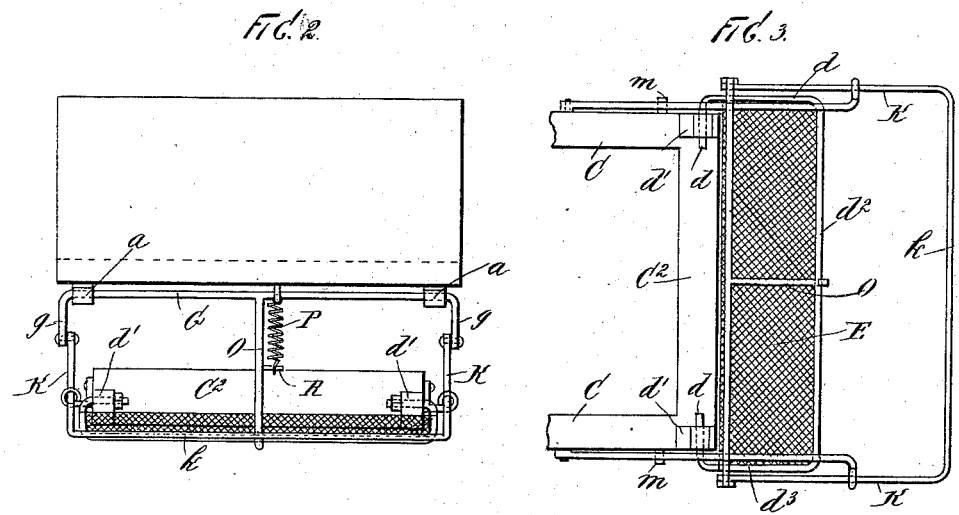
WITNESSES:
John Buckler,
C. Gerst.
INVENTOR
William H. Kaltenbeck
BY
Edgar Tate & Co
ATTORNEYS

UNITED STATES PATENT OFFICE.

WILLIAM H. KALTENBECK, OF ROXBURY, NEW YORK, ASSIGNOR OF TWO-THIRDS TO THOMAS WINTERS AND CHAS. C. KAUFMAN, OF MARGARETVILLE, NEW YORK.

CAR-FENDER.

SPECIFICATION forming part of Letters Patent No. 565,621, dated August 11, 1896.

Application filed November 13, 1895. Serial No. 568,769. (No model.)

*To all whom it may concern:*

Be it known that I, WILLIAM H. KALTENBECK, a citizen of the United States, and a resident of Roxbury, in the county of Delaware and State of New York, have invented certain new and useful Improvements in Guards or Fenders, of which the following is a specification, reference being had to the accompanying drawings, forming a part thereof, in which similar letters of reference indicate corresponding parts.

This invention relates to fenders or guards for tramway or other cars, and particularly to that class thereof known as "trip" fenders or guards; and the object of the invention is to provide an effective device of this class which is simple in construction and operation and by means of which the serious and sometimes fatal accidents which result from a person or object being struck by a car when in motion will be avoided.

The invention is fully disclosed in the following specification, of which the accompanying drawings form a part, in which—

Figure 1 is a side elevation of a portion of the end of a car provided with my improved fender or guard; Fig. 2, an end view thereof, and Fig. 3 a plan view with the platform of the car removed.

In the drawings forming part of this application, A represents the platform of a car, B the dashboard thereof, and C a part of the truck-frame. Two of the parts C are employed, one on each side of the car, and said parts comprise the bottom side bars of the truck-frame, and the forward ends thereof are preferably provided with downwardly-inclined and forwardly-directed projections C'.

In the practice of my invention I provide a main fender or guard frame D, composed of heavy wire or rod, the ends of which are bent inwardly, as shown at $d$ in Fig. 3, and passed through bearings or keepers $d'$, secured to the forward end of the rods C or to a cross-bar $C^2$, connected therewith, said wire being bent to form a forward cross-piece $d^2$ and side bars $d^3$, after which the ends are bent inwardly, as at $d$ and as hereinbefore described, and said main fender or guard frame is provided with a body portion E, of wire mesh or similar material.

The main fender or guard frame is pivotally supported by the inwardly-directed projecting ends $d$ thereof, and is adapted to be held in front of the truck-frame, as will be understood, and secured to the lower part of the platform A are hangers $a$, one being arranged on each side, and mounted therein is a bar G, having depending arms $f$, which are formed integral therewith, and pivotally connected with the lower end thereof are side arms K, which project forwardly and are connected or united by a forward cross rod or bar $k$.

Pivotally connected with the sides of the bars C, which constitute a part of the truck-frame, are rods M, which are passed through keepers $m$, also connected with the bars C, and said rods M are projected forwardly and provided on their front ends with eyes or loops $m'$, through which the side arms K are passed.

Secured to the rod or bar G, and centrally thereof, is a curved arm O, which projects downwardly and forwardly, and is provided at its lower end with a hook O', which catches under and supports the forward cross-rod $d^2$ of the main fender-frame, and secured to the bottom of the platform A is a spiral spring P, one end of which is secured to said arm O by means of a pin R or in any desired manner.

The operation will be readily understood from the foregoing description when taken in connection with the accompanying drawings. The frame, composed of the forward cross-rod $k$ and the side arms K, acts as a depressing-frame, and the normal position of the parts, when the guard is in operation, is that shown in Fig. 1. If a person or object should be struck by a car when in motion, the depressing-frame, or the cross-rod $k$ thereon, would be forced backward, and the curved arm O depressed by the depending arms $g$, secured to the cross-rod G, and the forward end of the main fender frame or guard D will drop onto the track, and the passage of such person or object beneath the car or the wheels thereof would be prevented. It will be understood that the operation of the spring P is to return the parts, consisting of the main fender or guard frame and the operating devices, to their proper positions, and the said parts are always in position for operation.

My invention is not limited to the exact construction, combination, and arrangement of parts as herein described, and I therefore reserve the right to make all such alterations therein and modifications thereof as fairly come within the scope of the invention.

Having fully described my invention, I claim and desire to secure by Letters Patent—

1. The combination with the platform of a car, and the truck-frame thereof, of a fender or guard frame pivotally connected with the end of the truck-frame, and projecting forward, a cross bar or rod pivotally mounted in hangers, secured to the bottom of the platform and provided at each end with depending arms, and also provided with a downwardly and a forwardly directed arm, which is adapted to support the forward part of the guard-frame and means connected with said depending arms for depressing the guard-frame when a person or object is struck, said means consisting of a depressing-frame, composed of a cross-rod, which extends crosswise of the track in front of the fender or guard frame, and side arms connected therewith, which are pivotally connected with the depending ends or arms of the rod or bar which is pivotally supported beneath the platform, and the truck-frame being also provided with rods or bars secured to the sides thereof, which extend forwardly and are provided with eyes or loops through which the side arms of the depressing-frame are passed and by which said depressing-frame is supported, substantially as shown and described.

2. The combination with the platform of a car, and the truck-frame thereof, of a fender or guard frame pivotally connected with the end of the truck-frame, and projecting forward, a cross bar or rod pivotally mounted in hangers, secured to the bottom of the platform and provided at each end with depending arms, and also provided with a downwardly and forwardly directed arm, which is adapted to support the forward part of the guard-frame, and means connected with said depending arms for depressing the guard-frame when a person or object is struck, said means consisting of a depressing-frame composed of a forward cross-rod, which extends crosswise of the track, in front of the fender or guard frame, and side arms connected therewith, which are pivotally connected with the depending ends or arms of the rod or bar which is pivotally supported beneath the platform, and the truck-frame being also provided with rods or bars secured to the sides thereof, which extend forwardly and are provided with eyes or loops through which the side arms of the depressing-frame are passed and by which said depressing-frame is supported, and the arm which is connected with the platform of the car, and is adapted to support the forward part of the fender or guard frame, being also provided with a contractile spring, which is secured to the platform of the car, and is adapted to hold the fender above the track, substantially as shown and described.

In testimony that I claim the foregoing as my invention I have signed my name, in presence of the subscribing witnesses, this 7th day of November, 1895.

WILLIAM H. KALTENBECK.

Witnesses:
BRUCE S. PRESTON,
A. CARTWRIGHT, Jr.